United States Patent [19]

Smith

[11] Patent Number: 5,624,757
[45] Date of Patent: Apr. 29, 1997

[54] PHOTOCHROMIC AND NON-PHOTOCHROMIC ARTICLES HAVING A PROTECTIVE COATING

[75] Inventor: Robert A. Smith, Murrysville, Pa.

[73] Assignee: Transitions Optical, Inc., Pinellas Park, Fla.

[21] Appl. No.: 448,846

[22] Filed: May 24, 1995

Related U.S. Application Data

[62] Division of Ser. No. 166,053, Dec. 13, 1993, abandoned.

[51] Int. Cl.$^6$ .......................... B32B 13/12; B32B 27/30; B32B 27/32; B32B 27/36
[52] U.S. Cl. .................. 428/412; 359/581; 359/586; 428/425.5; 428/447; 428/451; 428/452; 428/908.8
[58] Field of Search ................... 359/581, 586; 428/412, 425.5, 447, 451, 452, 908.8

[56] References Cited

U.S. PATENT DOCUMENTS

| | | | |
|---|---|---|---|
| 2,404,426 | 7/1946 | Bechtold et al. | 117/121 |
| 3,652,379 | 3/1972 | White et al. | 161/183 |
| 3,971,872 | 7/1976 | LeBeouf | 428/412 |
| 3,986,997 | 10/1976 | Clark | 260/29.2 |
| 3,998,991 | 12/1976 | Kaas | 428/447 |
| 4,120,992 | 10/1978 | Laurin et al. | 427/164 |
| 4,127,697 | 11/1978 | Laurin | 428/412 |
| 4,164,602 | 8/1979 | Fabel | 428/334 |
| 4,172,187 | 10/1979 | Fabel | 525/61 |
| 4,423,131 | 12/1983 | Limburg et al. | 430/59 |
| 4,741,992 | 5/1988 | Przezdziecki | 430/523 |
| 4,904,525 | 2/1990 | Taniguchi et al. | 428/328 |
| 5,037,871 | 8/1991 | Jones | 524/261 |
| 5,115,023 | 5/1992 | Basil et al. | 525/103 |
| 5,405,958 | 4/1995 | VanGemert | 544/71 |

FOREIGN PATENT DOCUMENTS

| | | |
|---|---|---|
| 62-212490 | 9/1987 | Japan. |
| 3-31678 | 1/1991 | Japan. |
| 4-345841 | 12/1992 | Japan. |

OTHER PUBLICATIONS

C.J.T. Landry et al, "In situ polymerization of tetraethoxysilane in polymers: chemical nature of the interactions", Polymer (1992), vol. 33, No. 7, pp. 1496 to 1506.

M. Toki et al, "Structure of poly (vinylpyrrolidone)–silica hybrid", Polymer Bulletin (1992) 29, pp. 653–660.

T. Saegusa, "Organic Polymer–Silica Gel Hybrid: A Precursor of Highly Porous Silica Gel", J. Macromol. Sci –Chem., (1991) A28(9), pp. 817–829.

M. E. Ellsworth et al, "Mutually Interpenetrating Inorganic–Organic Networks. New Routes into Nonshrinking Sol–Gel Composite Materials", J. Am. Chem. Soc. 1991, 113, pp. 2756.2758.

B. M. Novak et al, "Inverse Organic–Inorganic Composite Materials. Free Radical Routes into Nonshrinking Sol–Gel Composites", ACS Polymer Preprints, vol. 32, No. 3, 1991, pp. 512–513.

*Primary Examiner*—D. S. Nakarani
*Attorney, Agent, or Firm*—Frank P. Mallak; Irwin M. Stein

[57] ABSTRACT

Describes a coating composition for the preparation of abrasion resistant coatings consisting essentially of:

(a) 5 to 35 weight percent of a silane monomer mixture of (i) $C_1$–$C_{12}$ alkyl tri($C_1$–$C_6$)alkoxysilane and (ii) tetra ($C_1$–$C_6$)alkoxysilane, the weight ratio of (i) to (ii) being from 3:1 to 1:3;

(b) 1 to 9 weight percent of polyvinyl alcohol that is at least 72 percent hydrolyzed;

(c) a solvating amount of lower aliphatic alcohol;

(d) a catalytic amount of water-soluble acid;

(e) a leveling amount of nonionic surfactant; and (f) water in an amount sufficient to form hydrolysates of the silane monomers and to solubilize the polyvinyl alcohol and acid. Further described are transparent articles and photochromic articles comprising organic polymeric host material, organic photochromic compound(s), and a cured abrasion resistant coating prepared from the coating composition.

19 Claims, No Drawings ns
PHOTOCHROMIC AND NON-PHOTOCHROMIC ARTICLES HAVING A PROTECTIVE COATING

This is a division of application Ser. No. 08/166,053, filed Dec. 13, 1993, now abandoned.

DESCRIPTION OF THE INVENTION

The present invention relates to a new abrasion resistant coating composition, and more particularly, relates to a coating composition consisting essentially of a mixture of organoalkoxysilane and organooxysilane monomers, polyvinyl alcohol, nonionic surfactant(s), lower aliphatic alcohol solvent, water-soluble acid, and water. Still more particularly, this invention relates to articles such as optical elements, e.g., ophthalmic lenses, transparent sheets, films and photochromic articles such as photochromic optical elements, transparent sheets and films having on at least one surface thereof a cured coating of the coating composition of the present invention. The coating on such articles, which articles are commonly prepared from organic polymeric host materials, demonstrates abrasion resistance, improved adhesion to the surface to which it is applied and resistance to chemical attack. The coating also enhances the light fatigue resistance of the photochromic compound(s) used to prepare the photochromic articles.

Organic polymeric host materials that are typically used to make optical elements, transparent sheets and films have surfaces that are susceptible to abrasion and chemical attack. Often, such articles are coated with a protective coating to improve their abrasion resistance.

Abrasion resistant coatings that incorporate polyvinyl alcohol or hydrolyzed polyvinyl acetate and acid polysilicic acid ester, hydrolyzed polysilicic acid ester or hydrolyzed metal lower alkoxide have been described in U.S. Pat. Nos. 2,404,426; 3,652,379; 3,971,872; 3,998,991; 4,120,992; 4,423,131 and 5,037,871. Abrasion resistant coatings incorporating hydrolyzed polysilicic acid ester and polyvinyl acetals having a hydroxyl group content of 35 to 50 weight percent, calculated as polyvinyl alcohol, are described in U.S. Pat. Nos. 4,164,602 and 4,172,187. The use of polyvinyl pyrrolidone with organoalkoxysilane to form siloxane organic hybrid polymers is described in U.S. Pat. No. 5,115,023. Other abrasion resistant coatings formed from a partial condensate of a silanol or an organic silicon compound (or its hydrolysate) and particulate matter such as colloidal silica or micron-sized diamonds are described ill U.S. Pat. No. 3,986,997 and Japanese Patent Application 3-21678, respectively.

In U.S. Pat. No. 4,127,697, an improvement of the adhesion of the abrasion resistant coating described in U.S. Pat. No. 3,986,997 to a lens is obtained by treating the lens with a tie-coat comprising an A-alkylenealkoxysilane, wherein A contains a group reactive with the substrate, prior to applying the abrasion resistant coating. Japanese Patent Application 62-212490 describes a coating comprising composites made of methyltrimethoxysilane and other organic silicones, which coating is for controlling the rate of discoloration of organic photochromic viologen compounds incorporated into a soluble resin, such as polyvinyl alcohol, which is then coated onto a synthetic resin.

Photochromism is a reversible phenomenon exhibited by a compound which, when exposed to light radiation involving ultraviolet rays, such as the ultraviolet radiation in sunlight or in the light of a mercury lamp, changes color and then returns to its original color if the ultraviolet radiation is discontinued or the compound is stored in the dark. Various classes of photochromic compounds have been synthesized and suggested for use in applications in which a sunlight-induced reversible color change or darkening is desired. For example, spiro(indoline) pyridobenzoxazine photochromic compounds are described in U.S. Pat. No. 4,637,698. Spiro (indoline) naphthoxazines are described in U.S. Pat. Nos. 3,562,172; 3,578,602; 4,215,010; and 4,342,668. Benzopyrans and naphthopyrans having a nitrogen-containing substituent at the 2-position of the pyran ring are described in U.S. Pat. No. 4,818,096. All of the aforedescribed oxazine- and pyran-type organic photochromic compounds are reported to exhibit a color change of from colorless to purple/blue on exposure to a source of ultraviolet (UV) light, e.g., sunlight.

Other organic photochromic compounds are reported to exhibit a color change of from colorless to yellow/orange when exposed to a source of UV light. Examples of such organic photochromic compounds are benzopyrans and naphthopyrans having a spiro adamantane group at the 2-position of the pyran ring. These spiropyrans are described in U.S. Pat. No. 4,826,977. Other yellow/orange coloring organic photochromic compounds include the naphthopyran compounds described in U.S. Pat. No. 5,066,818. These compounds contain at least one ortho-substituted phenyl substituent at the 3-position of the pyran ring, preferably a monoortho-substituted phenyl substituent.

As reported in the literature, a major market demand for photochromic ophthalmic lenses are for those that darken to a brown or gray color. See, for example, U.S. Pat. No. 4,818,096 (column 2, lines 35–45). In order to achieve such a near neutral coloring of an article, blending of one organic photochromic substance having an absorption maximum within the range of between greater than 590 and about 700 nanometers and another organic photochromic substance exhibiting at least one absorption maximum and preferably two absorption maxima, within the range of between about 400 and less than 500 nanometers has been described in U.S. Pat. No. 4,968,454.

A drawback to the widespread commercial use of organic photochromic compounds is the loss of their ability to change color as a result of prolonged repeated exposure to UV light, i.e., the organic photochromic compounds lose their photochromism or their ability to change color and revert to their original colorless state. This loss of photochromic behavior is believed to be a result of irreversible decomposition of the organic photochromic compound and is referred to as fatigue or light fatigue.

It has been reported that the light fatigue resistance of spiro(indoline)naphthoxazine compounds may be increased by the use of a hindered amine light stabilizer (HALS) and optionally a complex of a nickel ion with an organic ligand as a singlet oxygen quencher. See, for example, U.S. Pat. No. 4,720,356. A similar stabilizing effect for organic naphthopyran compounds by a HALS material has not been reported. Consequently, there is a need for a stabilizing system which will improve the fatigue resistance of both oxazine-type and pyran-type organic photochromic compounds.

It has now been discovered that incorporating a mixture of organooxysilane monomers, e.g., a mixture of tetraalkoxysilanes and trialkoxysilanes in certain proportions, in a coating composition containing polyvinyl alcohol, nonionic surfactant(s), lower aliphatic alcohol solvent, water-soluble acid and water provides a coating composition, which when cured on the surface of an organic polymeric host material, results in a coating that confers resistance to abrasion and chemical attack to that host material surface, and also has improved adhesion to the host material surface, as compared for example to the coating described in U.S. Pat. No. 3,971,872. When the coating composition of the present invention is applied to and cured on the surface of photochromic articles, there is provided the additional benefit of improved fatigue resistance of organic photochromic substances used to achieve the photochromic effect. Such photochromic substances generally have absorption maxima within the visible range of between about 400 and about 700 nanometers.

The aforedescribed benefits may be achieved with a single-layer coating prepared from a coating composition that does not require a tie-coat and is substantially free of particulates such as colloidal silica and micron-sized diamonds, fluorosurfactants, such as a fluoroalkyl polyether, and trialkoxysilanes having an epoxy functionality.

DETAILED DESCRIPTION OF THE INVENTION

The use of polyvinyl alcohol or hydrolyzed polyvinyl acetate in combination with hydrolyzed polysilicic acid ester or hydrolyzed metal lower alkoxide in protective coating compositions has been described. Specifically, U.S. Pat. No. 3,998,991 describes a coating composition that includes a trialkoxysilane having epoxy functionality in combination with a tetraalkoxysilane; U.S. Pat. Nos. 31,971,872 and 4,120,992 claim a polysilicic acid ester of an alcohol containing from 1 to 12 carbon atoms, said ester having up to four silicic acid groups per silicon atom. The '992 patent includes a cross-linking agent, such as formaldehyde or zirconyl nitrate in the formulation. U.S. Pat. No. 4,423,131 describes an improved photoresponsive device containing as a protectant overcoating a top layer of a crosslinked polyvinylsilicate resulting from the reaction of polysilicic acid with a polyvinyl alcohol having a number average molecular weight of from 10,000 to about 100,000. The polysilicic acid component of the overcoating can be altered by the hydrolysis of trialkoxysilanes or the cohydrolysis of trialkoxysilane and tetraalkoxysilane. U.S. Pat. No. 5,037,873 describes a protective overcoat composition and photographic elements containing same comprising (a) a water-soluble hydroxylated polymer, (b) hydrolyzed metal lower alkoxide, or mixtures of such alkoxides, and (c) a fluoroalkyl polyether surfactant.

The coating formulation of the present invention is substantially free of epoxy functional trialkoxysilanes, formaldehyde and zirconyl nitrate cross-linking agents, fluoroalkyl polyether surface active agent and particulates. The coating formulation of the present invention is characterized by a specific ratio of trialkoxysilanes to tetraalkoxysilanes; polyvinyl alcohol that is at least 72 percent hydrolyzed for use on optical elements and is at least 95 percent hydrolyzed for use on photochromic optical elements.

The aqueous coating composition of the present invention contains from about 5 to about 35 weight percent, preferably 5 to 25 weight percent,of a silane monomer mixture (and hydrolysates thereof) comprising (i) a first silane monomer that is a $C_1$–$C_{12}$ alkyl tri($C_1$–$C_6$) alkoxysilane, preferably a $C_1$–$C_4$ alkyl tri($C_1$–$C_3$) alkoxysilane and (ii) a second silane monomer that is a tetra($C_1$–$C_6$) alkoxysilane, preferably a tetra($C_1$–$C_4$) alkoxysilane. The weight ratio in the silane monomer mixture of first silane monomer to second silane monomer may vary from about 3:1 to 1:3, preferably from about 2:1 to 1:3, and more preferably from about 1:1 to 1:3.

Suitable silane monomers that may be used as the first silane monomer include methyltriethoxysilane, ethyltrimethoxysilane, ethyltriethoxysilane, propyltrimethoxysilane, propyltriethoxysilane, hydrolysates thereof and mixtures of such silane monomers. Preferred first silane monomers are propyltrimethoxy silane and methyltriethoxysilane, more preferably methyltriethoxysilane.

Suitable silane monomers that may be used as the second silane monomer include tetramethoxysilane, tetraethoxysilane, tetra-n-propoxysilane, tetra-n-butoxysilane, hydrolysates thereof, and mixtures of such silane monomers. Preferably, tetraethoxysilane is used as the second silane monomer.

polyvinyl alcohol (PVA) is present in the coating composition at a level of from about 1 to about 9 weight percent. Suitable polyvinyl alcohols range in number average molecular weight from 2,000 to 150,000, preferably from 2,000 to 50,000, and are at least 72 percent hydrolyzed. Preferably, the PVA is present at a level of from 1 to 6 weight percent. For photochromic articles, the PVA is at least 95 percent hydrolyzed and more preferably, is at least 98 percent hydrolyzed.

A leveling amount of nonionic surfactant(s) is also present as a component in the coating composition. A leveling amount is that amount which is sufficient to spread evenly or level the coating composition on the surface of the synthetic polymeric host material to which it is applied. Typically, the nonionic surfactant is used in amounts from 0.1 to 1.0 weight percent, based on the amount of the silane monomer mixture. Suitable non-ionic surfactants are described in the Kirk Othmer Encyclopedia of Chemical Technology, 3th Edition, Vol.22, p.360 to p.377, the disclosure of which is incorporated herein by reference.

More particularly, the nonionic surfactant may be surfactants selected from the group consisting of ethoxylates of primary, secondary and branched paraffinic alcohols wherein the alcohol contains from about 6 to 20 carbon atoms and the average number of ethoxy groups are from 1 to 20; alkyl phenol ethoxylates and dialkyl phenol ethoxylates wherein each of the alkyl substituents contains from about 6 to about 12 carbon atoms and the average number of ethoxy groups are from 1 to 24; benzyl, propyleneoxy, butyleneoxy, phenoxy and $C_1$–$C_4$alkoxy capped alkyl phenol ethoxylates, wherein the average number of propylene or butyleneoxy groups is from 1 to 5; glycerol esters of fatty acids containing from 6 to 24 carbon atoms; ethoxylates and propoxylates of fatty acids wherein the fatty acids contain from 6 to 24 carbon atoms and the average number of ethoxy or propoxy groups is from 1 to 24; sorbitan fatty acid esters wherein the fatty acids contain from 6 to 24 carbon atoms and ethoxylated sorbitan fatty acids esters wherein the average number of ethoxy groups is from about 3 to 20; fatty acid alkanolamides, such as fatty acid diethanoloamides, where the fatty acid contains from 6 to 24 carbon atoms and the alkanolamide contains from 0 to 4 carbon atoms; amine ethoxylates such as tertiary amine ethoxylates, e.g., RN(R') R", wherein R is a group containing-from about 6 to 24 carbon atoms such as the residue of a fatty acid and R' and R" are ethoxy or polyethoxy groups having an average of 1 to 6 ethoxy groups; block copolymers of ethylene oxide and propylene oxide, e.g., ethoxylated polyoxypropylene glycols and propoxylated polyoxyethylene glycols; acetylenic diols and ethoxylated acetylenic diols; and capped nonionics represented by the formula $R(OCH_2CH_2)_nR'$ wherein R is $C_6$ to $C_{20}$ linear or branched alkyl, R' is selected from halogen e.g., chloro, benzyl, phenoxy, $C_1$ to $C_4$ alkoxy or —O($C_mH_{2m}$O)pH wherein m is 3 or 4 and p is 1 to 5; and n denotes the average number of ethylene oxide units and is a whole or fractional number ranging from 3 to 20.

Advantageously, the nonionic surfactant is an ethoxylated alkyl phenol such as the IGEPAL® DM surfactants or octylphenoxypolyethoxyethanol (available as TRITON® X-100),an acetylenic diol such as 2,4,7,9-tetramethyl-5-decyne-4,7-diol (available as SURFYNOL 104),ethoxylated acetylenic diols, such as the SURFYNOL 400 series, and capped nonionics such as the benzyl capped octyl phenol ethoxylates (available as TRITON® CF87) and the propylene oxide capped alkyl ethoxylates, which are available as the PLURAFAC® RA series of surfactants, and octylphenoxyhexadecylethoxy benzyl ether.

A solvating amount of a lower aliphatic alcohol solvent is also present as a component in the coating composition. The lower aliphatic alcohol solvent as used herein and in the claims may be represented by the formula $[(R^2)_gR^3]_h(C_1-C_3)$OH, wherein $R^2$ and $R^3$ are each $C_1-C_2$ alkoxy and g and h are each the integers 0 or 1. Preferably, the solvent is a $C_1-C_3$ alkanol or an aliphatic alcohol of the formula $[(R^2)_gR^3]_h(C_1-C_3)$OH wherein h is 1, and g is 0 or 1. A solvating amount is that amount which is sufficient to solubilize the silane monomers. The solvating amount may represent up to about 50 weight percent of the coating composition. When the solvating amount is greater than 40 weight percent of the coating composition, the composition is particularly suited for use with vision correcting ophthalmic lenses, such as bifocal lenses because it provides uniform distribution and minimal buildup of the coating on the edges on such lenses. Examples of suitable solvents include methanol, ethanol, propanol, 2-ethoxyethanol, 2-(2-methoxyethoxy)ethanol, 2-methoxyethanol, 2-(2-ethoxymethoxy)ethanol, 1-propanol, 2-propanol, and 1-methoxy-2-propanol.

The coating composition also contains a catalytic amount of a water-soluble acid, e.g., as an aqueous acidic solution. A catalytic amount is that amount which is sufficient to result in the polycondensation of the silane monomers and subsequent cross linking with the polyvinyl alcohol. The aqueous acidic solution may be prepared with an organic carboxylic acid or inorganic acid selected from the group consisting of acetic, formic, glutaric, maleic, nitric, hydrochloric, phosphoric, hydrofluoric, and sulfuric acids. Preferably, the acidic solution is hydrochloric acid. Water is also present in an amount sufficient to solubilize the polyvinyl alcohol component and the catalytic amount of aqueous acidic solution and to form hydrolysates of the silane monomer components. The sum of all of the components of the coating composition total 100 weight percent.

Photochromic compounds that may be utilized to prepare photochromic articles of the present invention, such as those heretofore described, are organic photochromic compounds or substances containing same that may be incorporated, e.g., dissolved or dispersed, in the organic polymeric host material used to prepare the photochromic articles. A first group of organic photochromic substances contemplated for use to form the photochromic articles of the present invention are those having an activated absorption maximum within the visible range of greater than 590 nanometers, e.g., between about greater than 590 to 700 nanometers. These materials typically exhibit a blue, blueish-green, or blueish-purple color when exposed to ultraviolet light in an appropriate solvent or matrix. Many of such compounds are described in the open literature. For example, spiro(indoline) naphthoxazines have been described, among others, in U.S. Pat. Nos. 3,562,172; 3,578,602; 4,215,010; and 4,342,668. Spiro(indoline)-naphthoxazines having certain substituents at the 8' and 9' positions of the naphthoxazine portion of the molecule are the subject of co-pending U.S. patent application Ser. No. 07/993,587, filed Dec. 21, 1992. Spiro (indoline)pyridobenzoxazines are described in U.S. Pat. No. 4,637,698. Spiro(benzindoline)pyridobenzoxazines and spiro(benzindoline)naphthoxazines are described in U.S. Pat. No. 4,931,219. Spiro(benzindoline)naphthopyrans are described in Japanese Patent Publication 62/195383. Spiro (indoline)benzoxazines are described in U.S. Pat. No. 4,816, 584. Spiro(indoline)benzopyrans, spiro(indoline) naphthopyrans and spiro(indoline)quinopyrans are described, for example, in U.S. Pat. No. 4,880,667. Benzopyrans and naphthopyrans having a nitrogen-containing substituent at the 2-position of the pyran ring are described in U.S. Pat. No. 4,818,096. Spiro(indoline)pyrans are also described in the text, Techniques in Chemistry, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between about 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; and 5,066,818. Examples of benzopyrans and naphthopyrans having a spiro adamantane group attached to the pyran ring are described in U.S. Pat. No. 4,826,977. Naphthopyrans, i.e., [3H-2,1-b naphthopyrans], having at least one ortho-substituted phenyl substituent at the 3-position of the pyran ring are described in U.S. Pat. No. 5,066,818. Naphthopyran compounds having certain substituents at the number 8 carbon atom and certain substituents at the number 7 or 9 carbon atom, all substituents being on the naphtho portion of the naphthopyran, are the subject of co-pending U.S. patent application Ser. No. 08/080,246, filed Jun. 21, 1993. Naphthopyrans substituted on the pyran ring with (i) an aryl substituent and (ii) a phenyl substituent having a 5- or 6-member heterocyclic ring fused at the number 3 and 4 carbon atoms of the phenyl substituent are the subject of co-pending U.S. patent application Ser. No.08/080,250 filed Jun. 21, 1993, now U.S. Pat. No. 5,384,077. Naphthopyran compounds substituted at the number 8 carbon atom on the naphtho portion of the naphthopyran ring, with for example a methoxy group, are the subject of U.S. Pat. No. 5,238,931. Naphthopyran compounds, examples of which are 3-aryl-3-arylalkenyl naphthopyrans, are the subject of U.S. patent application Ser. No. 07/954,630, filed Sep. 30, 1992, now U.S. Pat. No. 5,274,132.

A third group of organic photochromic substances contemplated for use to form the photochromic articles of the present invention are those having an absorption maximum within the visible range of between about 400 to about 500 nanometers and another absorption maximum within the visible range of between about 500 to about, 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benz portion of the benzopyran. Such materials are the subject of U.S. patent application No. 08/030,932, filed Mar. 12, 1993 which application was refiled as Ser. No. 08/201,948, on Feb. 24, 1994, which application was refiled as Ser. No. 08/220,344 on Mar. 30, 1994, now U.S. Pat. No. 5,429,774.

The disclosures of such photochromic compounds in the aforedescribed patents and patent applications are incorporated herein, in toto, by reference. The photochromic articles of the present invention may contain one photochromic compound or a mixture of photochromic compounds, as desired. Mixtures of photochromic compounds may be used to attain certain activated colors such as a near neutral gray or brown.

The organic photochromic substances of the second contemplated group described herein, i.e., those that color to yellow/orange may be combined with or used in conjunction with the first group of photochromic substances that color to purple/blue, e.g., the spirooxazine-type compounds, or both may be combined with or used in conjunction with the third group of described organic photochromic substances that color from yellow/brown to purple/gray. Each of the photochromic substances described herein may be used in amounts and in a ratio such that an organic host material to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic compounds. The relative amounts of the aforesaid photochromic compounds used will vary and depend in part upon the relative intensities of the color of the activated species of such compounds, and the ultimate color desired. Generally, the weight ratio of the aforedescribed organic photochromic substance combination, i.e., (first to second), (first to third), and (second to third), will vary from about 1:3 to about 3: 1, e.g. , between about 0.75: 1 and about 2: 1. The combination of the first, second, and third organic photochromic substances may have a weight ratio that will vary from about 1:3:1 to 3:1:3.

A near neutral gray color exhibits a spectrum that has relatively equal absorption in the visible range between 400 and 700 nanometers, e.g., between 440 and 660 nanometers. A near neutral brown color exhibits a spectrum in which the absorption in the 440–550 nanometer range is moderately larger than in the 550–700 nanometer range. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., x=X/(X+Y+Z) and y=Y/(X+Y+Z). Color as described in the CIE system can be plotted on a chromaticity diagram, usually a plot of the chromaticity coordinates x and y. See pages 47–52 of *Principles of Color Technology*, by F. W. Billmeyer, Jr., and Max Saltzman, Second Edition, John Wiley and Sons, New York (1981). As used in the specification, a near neutral color is one in which the chromaticity coordinate values of "x" and "y" for the color are within the following ranges (D65 illuminant): x =0.260 to 0.400, y =0.280 to 0.400 following activation to 40 percent luminous transmission by exposure to solar radiation (Air Mass 1 or 2).

The photochromic compositions of the present invention may be applied to or incorporated into a host material by various methods described in the art. Such methods include dissolving or dispersing the substance within the host material, e.g., imbibition of the photochromic substance into the host material by immersion of the host material in a hot solution of the photochromic substance or by thermal transfer; providing the photochromic substance as a separate layer between adjacent layers of the host material, e.g., as a part of a polymer film; and applying the photochromic substance as part of a coating placed on the surface of the host material. The term "imbibition" or "imbibe" is intended to mean and include permeation of the photochromic substance alone into the host material, solvent assisted transfer absorption of the photochromic substance into a porous polymer, vapor phase transfer, and other such transfer mechanisms.

Compatible (chemically and color-wise) tints, i.e., dyes, may be applied to the host material to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the host matrix when the photochromic substances is in an unactivated state.

The polymer host material will usually be transparent, but may be translucent or even opaque. The polymer product for photochromic articles need only be transparent to that portion of the electromagnetic spectrums, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Further, the resin color should not be such that it masks the color of the activated form of the photochromic substance, i.e., so the change in color is readily apparent to the observer. Preferably, the host material article is a solid transparent or optically clear material, e.g., materials suitable for optical applications, such as plano and vision correcting ophthalmic lenses, windows, automotive transparencies, e.g., windshields, aircraft transparencies, plastic sheeting, polymeric films, etc.

Examples of host materials which may be used with the photochromic substances or compositions described herein include: polymers, i.e., homopolymers and copolymers, of polyol(allyl carbonate) monomers, polymers, i.e., homopolymers and copolymers, of polyfunctional acrylate monomers, polyacrylates, poly(alkylacrylates) such as poly (methyl methacrylate), cellulose acetate, cellulose triacetate, cellulose acetate propionate, cellulose acetate butyrate, poly (vinyl acetate), poly(vinyl alcohol), poly(vinyl chloride), poly (vinylidene chloride), polyurethanes, polycarbonates, polyesters, poly (ethylene terephthalate), polystyrene, copoly(styrene -methyl methacrylate), copoly (styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers.

Transparent copolymers and blends of transparent polymers are also suitable as host materials. Preferably, the host material is an optically clear polymerized organic material prepared from a polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate)

monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups as described in U.S. Pat. No. 5,200,485; cellulose acetate, cellulose propionate, cellulose butyrate, cellulose acetate butyrate, polystyrene and copolymers of styrene with methyl methacrylate, vinyl acetate and acrylonitrile.

The amount of photochromic substance or composition containing same applied to or incorporated into a host material is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical host material may range from about 0.15 to about 0.35 milligrams per square centimeter of surface to which the photochromic substance(s) is incorporated or applied.

The coating composition of the present invention may be used in a coating process such as that described in U.S. Pat. No. 3,971,872, the disclosure of which is incorporated herein by reference. Preparation of the surface of the organic polymeric host material prior to coating is necessary for the purpose of cleaning the surface and promoting adhesion and water resistivity. Effective measures may include ultrasonic cleaning; washing with an aqueous mixture of solvent, i.e., isopropanol, activated gas treatment, i.e., treatment with ions, electrons, or excited gas, and chemical treatment such as hydroxylation of the surface with an aqueous solution of alkali, e.g., sodium hydroxide or potassium hydroxide. See column 3, lines 13 to 25 of U.S. Pat. No. 3,971,872, and column 6, lines 10 to 48 of U.S. Pat. No. 4,904,525, which disclosures are incorporated herein by reference.

At least one side of the organic polymeric host is coated with the coating composition of the present invention using any conventional coating method. The coated host material is then dried at ambient or at temperatures above ambient but below curing temperatures, e.g., up to about 80° C. Afterwards, the dried coated host material is heated to a temperature of between 90° C. to 125° C. for a period of about 1 to 3 hours in order to cure the abrasion resistant coating. While a range of temperatures has been provided for drying and curing the coated lens, it will be recognized by persons skilled in the art that other temperatures higher and lower than disclosed above may be used.

Conventional methods for coating the organic polymeric host material such as flow coating, dip coating, spin coating, roll coating, curtain coating, and spray coating may be used to apply the coating composition. Application of the coating is typically done in an environment that is substantially free of dust. Methods for curing the coating in addition to conventional radiant heat exposure i.e., heating in an oven, may include irradiating with infrared, gamma, or electron radiation so as to promote the polymerization reaction of the reactive components.

The present invention is more particularly described in the following examples, which are intended as illustrative only, since numerous modifications and variations therein will be apparent to those skilled in the art.

EXAMPLE 1

Water (630 grams) was added to a reaction flask and heated until boiling. Thirty-five (35 grams) of polyvinyl alcohol, available as Product No. 69274, vinyl alcohol polymer (fully hydrolyzed—very low molecular weight) from Monomer-Polymer Laboratories, was added to the reaction flask with stirring. Ethanol (392 grams) was slowly added to the reaction flask in order to prevent the rapid cooling of the reaction mixture. Subsequently, 2 grams of concentrated hydrochloric acid, 26.25 grams of methyltriethoxysilane, 78.75 grams of tetraethoxysilane and 0.5 gram of octylphenoxypolyethoxyethanol (TRITON® X-100) were added to the reaction flask with rapid stirring. The contents of the reaction flask were cooled to room temperature prior to use.

EXAMPLE 2

The procedure of Example 1 was followed except that 75 percent hydrolyzed polyvinyl alcohol having an approximate number average molecular weight of 2000, 441 grams of water and 581 grams of ethanol were used.

EXAMPLE 3

The procedure of Example 1 was followed except that 92.75 grams of tetraethoxysilane and 12.25 grams of methyltriethoxysilane were used.

EXAMPLE 4

The procedure of Example 1 was followed except that 87 percent hydrolyzed polyvinyl alcohol having an approximate number average molecular weight of 3,000; 441 grams of water; grams of ethanol; and 4 grams of concentrated hydrochloric acid were used.

EXAMPLE 5

The procedure of Example 1 was followed except that 87 percent hydrolyzed polyvinyl alcohol having an approximate number average molecular weight of 3,000; 441 grams of water; grams of ethanol; 4 grams of concentrated hydrochloric acid; and 23.62 grams of methyltriethoxysilane were used.

EXAMPLE 6

The procedure of Example 1 was followed except that 105 grams of methyltriethoxysilane was used and the tetraethoxysilane reactant was omitted. The resulting product solidified and could not be used as a coating composition.

COMPARATIVE EXAMPLE 1

The procedure of Example 1 was followed except that 105 grams of tetraethoxysilane was used and the methyltriethoxysilane reactant was omitted.

COMPARATIVE EXAMPLE 2

The procedure of Example 1 was followed except that 140 grams of tetraethoxysilane was used and the methyltriethoxysilane reactant was omitted.

EXAMPLE 7

Part A

Transitions® Plus lens blanks, a photochromic plastic lens blank reported to be prepared from a polymerizate of a polyol (allyl carbonate) composition, which are sold by Transition Optical Co., were rinsed with isopropanol, etched in 50% sodium hydroxide for 10 minutes at ambient room temperature, then rinsed with de-ionized water and finally rinsed with isopropanol before air drying. The coating solutions prepared in Examples 1 and 3 and Comparative Example 1 were applied to the lenses by dip coating. The coating solution was "dropped" away from the suspended sample at a carefully controlled rate of 90 millimeters per minute. Coatings were air dried inside a clean hood until tack free (usually 10–20 minutes) and were then cured in a hot air oven for two and one half hours at the temperatures indicated in Table I. The thickness of the coatings was about 1 to 2 microns.

The lenses to be coated with the Example 2 coating composition were bifocal Transition® Plus lens blanks. These lenses were etched in 12 weight percent aqueous sodium hydroxide for three minutes at 50° C., rinsed with a mixture of de-ionized water and isopropanol, and air dried. The dry lenses were dip coated with the coating composition of Example 2. The coating solution was dropped away at a rate of 160 millimeters per minute, held at 56° C. until dry, and cured at 108° C. for 2.5 hours. The resulting coating had a thickness of 1.2 microns.

The coating solutions prepared in Examples 4 and 5 were applied to the Transition® Plus lens blanks by spin-coating at 1,000 revolutions per minute. These lenses were prepared before coating using the same procedures used for the lenses coated with Examples 1 and 3 and Comparative Example 1. After drying at room temperature inside of a clean hood, the lenses were held at 56° C. for 20 minutes and then cured at 115° C. for two and one-half hours. The thickness of the coatings was about 1 to 2 microns.

The coated and cured lens blanks were scribed with a crosshatch pattern (grid) on the coating surface and immersed and held in boiling water for one hour to "age" the lens and simulate chemical attack. Adhesion testing was performed on the aged lenses by applying 3M Scotch Tape #600 to the grid on each lens and removing it. This was done three times and the percent coating loss was determined by a qualitative visual analysis. The results for lenses coated with the coating composition of Examples 1, 2, and 3 and Comparative Example 1 are reported in Table 1, and the results for the lenses coated with the coating compositions of Examples 4 and 5 are reported in Table 2.

PART B

Test square polymerizates prepared from a diethylene glycol (allyl carbonate) composition were rinsed before and after etching as done in Part A for lens blanks coated with the solutions prepared in Examples 1 and 3 and Comparative Example 1. Each test square measured ⅛ inch (0.3 centimeter) ×2 inch (5.1 centimeters) ×2 inch (5.1 centimeters). The test squares were etched in the following manner: test squares to be coated with the solutions of Examples 1 and 2 were immersed for three minutes in 15 weight percent aqueous sodium hydroxide solution maintained at a temperature of 50° C.; test squares to be coated with the solution of Comparative Example 2 were immersed for ten minutes in a 50 weight percent aqueous sodium hydroxide solution maintained at room temperature. The coating solutions prepared in Examples 1 and 2 and Comparative Example 2 were applied to the etched test squares by dip coating. The coating solution was "dropped" away from the suspended sample at a carefully controlled rate of 90 millimeters per minute.

Coatings were air dried inside a clean hood until tack free (usually 10–20 minutes). The test squares coated with the solution of Examples 1 and 2 were cured in a hot air oven for two and one half hours and the test squares coated with the solution of Comparative Example 2 were cured in a hot air oven for two hours. Curing temperatures are indicated in Table 3. The thickness of the coating on the test squares was approximately 1 micron as determined by optical microscopy. Abrasion resistance of the coated test squares was determined using ASTM Standard Test Method F735–81. The coated and uncoated test squares were exposed to 600 cycles of oscillation in the ASTM test method. The Bayer Abrasion Resistance Index (BARI), listed in Table 3 as duplicate results for each test square, was calculated by dividing the percent haze obtained with uncoated test squares made of homopolymers prepared from CR-39® monomer by the percent haze of the coated test sample. The resulting number is an indication of how much more abrasion resistant the coated test sample is as compared to uncoated test squares made of homopolymers prepared from CR-39® monomer. Haze measurements were performed before and after abrasion testing with a Hunter Lab Model D25P Colorimeter.

Part C

Photochromic dyes were incorporated into test square polymerizates prepared from a diethylene glycol bis(allyl carbonate) composition by an imbibition process. The test squares measured ⅛ inch (0.3 centimeter) ×2 inch (5.1 centimeters) ×2 inch (5.1 centimeters). A photochromic composition having a 50/32/18 weight ratio of 5-acetoxy-3-(2,4-dimethoxy)phenyl-3-(4-methoxy) phenyl-3H-naphtho[2,1 -b]pyran/1,3-dihydro-3,3-dimethyl-5-methoxy-1-propyl spiro[2H-indole-2,3'-[3H]pyrido{3,2-f}(1,4) benzoxazine]/1,3-dihydro-1-propyl-3,3,5,6-tetramethylspiro[2H-indole-2,3'-[3H]pyrido{3,2-f}(1,4) benzoxazine] was dissolved in a 1:9 mixture of ethyl cellulose:toluene to form a 10 weight percent solution. The solution was then spin coated onto the test squares and allowed to air dry. Samples were then heated in a hot air oven at 135° C. for 90 minutes in order to thermally transfer the photochromic into the test squares. After cooling, the ethyl cellulose/toluene resin film was removed from the test squares by washing with acetone.

The photochromic test squares were rinsed before and after etching as done in Part A for lens blanks coated with the solution prepared in Example 1 and etched for three minutes in a 15 weight percent aqueous sodium hydroxide solution maintained at a temperature of 50° C. The coating solution prepared in Example 1 was applied to the lenses by dip coating. The coating solution was "dropped" away from the suspended sample at a carefully controlled rate of 90 millimeters per minute. The coated test squares were air dried inside a clean hood until tack free (usually 10–20 minutes) and were cured in a hot air oven for two and one-half hours at 125° C.

The coated and uncoated test squares were placed in a QUV Accelerated Weathering Tester, made by the Q Panel Co., Cleveland, Ohio, operated at 52° C., and were exposed to 351 nanometer ultraviolet light in the tester for selected time intervals. After each time interval, coated and uncoated test squares were removed and exposed to 365 nanometer ultraviolet light for about 15 minutes to activate the photochromic compounds and then placed into a 76° C. oven for about 15 minutes to bleach or inactivate the photochromic compounds. The test squares were then cooled to room temperature, exposed to fluorescent room lighting for at least 2 hours and then kept covered for at least 2 hours prior to testing on an optical bench maintained at 75° F. (23.9° C.). The bench was mounted with a 150 watt Xenon arc lamp, a remote controlled shutter, a copper sulfate bath acting as a heat sink for the arc lamp, a Schott WG-320 nm cut off filter which removes short wavelength radiation; neutral density filter(s) and a sample holder in which the square to be tested was inserted. A collimated beam of light from a tungsten lamp was passed through the square at a small angle normal to the square. After passing through the square, the light from the tungsten lamp was directed through a photopic filter attached to a detector. The photopic filter passes wavelengths such that the detector mimics the response of the human eye. The output signals from the detector(s) were processed by a radiometer.

Change in optical density (ΔOD) was determined by inserting an imbibed square in the bleached state into the sample holder adjusting the transmittance scale to 100%, opening the shutter from the Xenon lamp to provide ultraviolet radiation to change the imbibed square from the bleached state to an activated (i.e., darkened) state, measuring the transmittance in the activated state, and calculating the change in optical density according to the formula ΔOD=log(100/%Ta) where %Ta is the percent transmittance in the activated state and the logarithm is to the base 10. The period of exposure to the ultraviolet light from the Xenon lamp at the time the percent transmittance is determined is one minute. The results listing percent optical density retained by the sample coated with Example 1 and the uncoated sample are included in Table 4.

TABLE 1

Aged Adhesion Results for Test Coatings

| Cure Temperature | Percent Coating Loss | | | |
|---|---|---|---|---|
| | Example 1 | Example 2 | Example 3 | Comparative Example 1 |
| 105° C. | 0 | 0 | 4 | 100 |
| 115° C. | 0 | 0 | 42 | 100 |

TABLE 2

Aged Adhesion Results for Test Coatings

| Cure Temperature | Example 4 | Percent Coating Loss Example 5 |
|---|---|---|
| 115° C. | 0, 0, 0, 0 | 0*, 0*, 100, 100 |

*These lenses showed no loss of adhesion but were crazed, i.e., had cracks in the coating that were visible to the naked eye.

TABLE 3

Bayer Abrasion Resistance Index Results for Duplicate Test Samples

| Cure Temperature | Example 1 | Example 2 | Comparative Example 2 |
|---|---|---|---|
| 95° C. | 2.6, 2.1 | 1.1, 1.2 | 4.0, 5.4 |
| 105° C. | 3.4, 2.7 | 2.2, 2.2 | 8.7, 8.2 |
| 115° C. | 2.3, 4.3 | 2.4, 2.4 | 8.7, 9.2 |
| 125° C. | 2.3, 2.0 | 2.8, 2.3 | 15.0, 8.2 |

TABLE 4

Percent Optical Density Retained by Coated and Uncoated Photochromic Test Squares Measured at Selected Time Intervals

| Hours | Uncoated | Coated with Composition of Example 1 |
|---|---|---|
| 0 | 100 | 100 |
| 20 | 73 | 91 |
| 100 | 62 | 85 |
| 150 | 56 | 72 |
| 200 | 53 | 71 |
| 250 | 48 | 70 |

In Table 1, the results for the lenses coated with the coating compositions of Examples 1 and 2 show no loss of adhesion while the results for the lenses coated with the coating compositions of Example 3 and Comparative Example 1 show from 4 to 100 percent loss. Any loss of adhesion is unacceptable. The results in Table 2 show no loss of adhesion for all of the lenses coated with the coating composition of Example 4 and for half of the lenses coated with the coating composition of Example 5. However, adherent coatings prepared from composition of Example 5 were crazed. This is the occurrence of visible cracks in the coating. Crazing is an unacceptable characteristic of a coated lens that is also considered as a failure of the aged adhesion test. All of the tested lenses coated with the composition of Example 4 showed no visible signs of crazing.

The coating compositions of Examples 1, 2, and 4 contain a silane monomer mixture of (i) methyltriethoxysilane to (ii) tetraethoxysilane having a weight ratio of 1:3. The coating compositions of Examples 3 and 5 have a weight ratio of (i) : (ii) of 1:7.6 and 1:3.9, respectively. The coating composition of Comparative Example 1, as well as that of Comparative Example 2, is substantially free of (i). As previously mentioned, the coating composition of Example 6 is substantially free of (ii) and resulted in a solid product that could not be used. In the present invention, the weight ratio of (i) a first silane monomer to (ii) a second silane monomer ranges from about 3:1 to 1:3.

The results in Table 3 for the test squares coated with the coating compositions of Examples: 1 and 2 and cured at 105° C. or above revealed an improvement of abrasion resistance of 2 or more times that of test squares made of homopolymers prepared from CR-39® monomer. Of particular note is that these results were not significantly effected by increasing the cure temperature. This is a beneficial characteristic of the coating since curing ovens maintain a set temperature by adjusting to upper and lower internal temperatures. The results for the coating composition of Comparative Example 2 reveal increases of abrasion resistance ranging from 4.0 to greater than 9.2 over the results for test squares made of homopolymer prepared from CR-39® monomer, which correspond generally to the increasing cure temperature. Bayer Abrasion Resistance Indices (higher than 4) result in a greater likelihood of crazing or cracks forming in the coating. The results listed in Table 4 for the photochromic test squares coated with the coating composition of Example 1 demonstrate that the coated sample retains a higher percent optical density than the uncoated sample over the entire test period of 250 hours.

The present invention has been described with reference to specific details of certain embodiments thereof. It is not intended that such details should be regarded as limitations upon the scope of the invention except insofar as they are included in the accompanying claims:.

I claim:

1. An article comprising in combination, an organic polymeric host material and on at least one surface thereof a coating prepared by curing a coating composition consisting essentially of:
   (a) about 5 to 35 weight percent of a silane monomer mixture of (i) $C_1$–$C_{12}$ alkyl tri($C_1$–$C_6$)alkoxysilane and (ii) tetra($C_1$–$C_6$)alkoxysilane, the weight ratio of (i) to (ii) being from 3:1 to 1:3;
   (b) about 1 to 9 weight percent of polyvinyl alcohol that is at least 72 percent hydrolyzed;
   (c) a solvating amount of lower aliphatic alcohol;
   (d) a catalytic amount of water-soluble acid;
   (e) a leveling amount of nonionic surfactant; and
   (f) water in an amount sufficient to form hydrolysates of said silane monomers and, to solubilize said polyvinyl alcohol and acid.

2. The article of claim 1 wherein from about 5 to 25 weight percent of the silane monomer mixture is used; the silane monomers are (i) $C_1$–$C_4$ alkyl tri($C_1$–$C_3$)alkoxysilane and (ii) tetra($C_1$–$C_4$)alkoxysilane; from 1 to 6 weight percent of polyvinyl alcohol is used; and the lower aliphatic alcohol is a $C_1$–$C_3$ alkanol.

3. The article of claim 2 wherein the first silane monomer (i) is propyltrimethoxysilane or methyltriethoxysilane and the second silane monomer (ii) is tetraethoxysilane; the water soluble acid is selected from the group consisting of acetic, glutaric, nitric, sulfuric, and hydrochloric acid; and the nonionic surfactant is selected from the group consisting of 2,4,7,9-tetramethyl-5-decyne-4,7-diol, octyl phenoxyhexadecylethoxy benzyl ether and octylphenoxypolyethoxyethanol.

4. The article of claim 3 wherein the first silane monomer (i) is methyltriethoxysilane and the second silane monomer (ii) is tetraethoxysilane; the polyvinyl alcohol is at least 87 percent hydrolyzed; the lower aliphatic alcohol is ethanol; the water-soluble acid is nitric acid or glutaric acid; and the nonionic surfactant is octylphenoxypolyethoxyethanol.

5. The article of claim 1 wherein the article is an optical element.

6. The article of claim 5 wherein the organic polymeric host material is a homopolymer or copolymer of diethylene glycol bis(allyl carbonate), polycarbonate resin, poly(methyl methacrylate) or poly(vinyl butyral).

7. The article of claim 6 wherein the optical element is a lens.

8. The article of claim 5 wherein the organic polymeric host material is a polymer prepared from polyol(allyl carbonate) monomer.

9. The article of claim 1 wherein the organic polymeric host material is selected from the group consisting of polymers prepared from polyol(allyl carbonate) monomer, polyfunctional acrylate monomer, acrylate monomer, alkylacrylate monomer, cellulose acetate, cellulose triacetate, cellulose acetate propionate, cellulose acetate butyrate, poly(vinyl acetate), poly(vinyl alcohol), poly(vinyl chloride) poly(vinylidene chloride), polycarbonate, polyurethanes, polyesters, poly(ethylene terephthalate), polystyrene, copoly(styrene -methyl methacrylate), copoly(styrene-acrylonitrile), polyvinylbutyral and diallylidene pentaerythritol.

10. A photochromic article comprising, in combination, an organic polymeric host material, a photochromic amount of at least one organic photochromic compound associated with said host material, and a coating on at least one surface of said article that is prepared by curing a coating composition consisting essentially of:
   (a) about 5 to 35 weight percent of a silane monomer mixture of (i) $C_1$–$C_{12}$ alkyl tri($C_1$–$C_6$)alkoxysilane and (ii) tetra($C_1$–$C_6$)alkoxysilane, the weight ratio of (i) to (ii) being from 3:1 to 1:3;
   (b) about 1 to 9 weight percent of polyvinyl alcohol that is at least 95 percent hydrolyzed;
   (c) a solvating amount of lower aliphatic alcohol;
   (d) a catalytic amount of water-soluble acid;
   (e) a leveling amount of nonionic surfactant; and
   (f) water in an amount sufficient to form hydrolysates of said silane monomers and to solubilize said polyvinyl alcohol and acid.

11. The photochromic article of claim 10 wherein from about 5 to 25 weight percent of the silane monomer mixture is used; the silane monomers are (i) $C_1$–$C_4$ alkyl tri($C_1$–$C_3$) alkoxysilane and (ii) tetra($C_1$–$C_4$)alkoxysilane; from 1 to 6 weight percent of polyvinyl alcohol is used; and the lower aliphatic alcohol is a $C_1$–$C_3$ alkanol.

12. The photochromic article of claim 11 wherein the first silane monomer (i) is propyltrimethoxysilane or methyltriethoxysilane and the second silane monomer (ii) is tetraethoxysilane; the water-soluble acid is selected from the group consisting of acetic, glutaric, nitric, sulfuric, and hydrochloric acid; and the nonionic surfactant is selected from the group consisting of 2,4,7,9-tetramethyl-5-decyne-4,7-diol, octyl phenoxyhexadecylethoxy benzyl ether, and octylphenoxypolyethoxyethanol.

13. The photochromic article of claim 12 wherein the first silane monomer (i) is methyltriethoxysilane and the second silane monomer (ii) is tetraethoxysilane; the polyvinyl alcohol is at least 98 percent hydrolyzed; the lower aliphatic alcohol is ethanol; the water-soluble acid is nitric acid or glutaric acid; and the nonionic surfactant is octylphenoxypolyethoxyethanol.

14. The photochromic article of claim 11 wherein the article is an optical element.

15. The photochromic article of claim 14 wherein the optical element is a lens.

16. The photochromic article of claim 10 wherein the organic polymeric host material is selected from the group consisting of polymers prepared from polyol(allyl carbonate) monomer, polyfunctional acrylate monomer, acrylate monomer, alkylacrylate monomer, cellulose acetate, cellulose triacetate, cellulose acetate propionate, cellulose acetate butyrate, poly(vinyl acetate), poly(vinyl alcohol), poly(vinyl chloride), poly(vinylidene chloride), polycarbonate, polyurethanes, polyesters, poly(ethylene terephthalate), polystyrene, copoly(styrene-methyl methacrylate), copoly(styrene-acrylonitrile), polyvinylbutyral and diallylidene pentaerythritol.

17. The photochromic article of claim 16 wherein the organic polymeric host material is a homopolymer or copolymer of diethylene glycol bis(allyl carbonate), polycarbonate resin, poly(methyl methacrylate) or poly(vinyl butyral).

18. The photochromic article of claim 17 wherein the organic photochromic compound is selected from the group consisting of (i) a first organic photochromic substance having an activated absorption maxima in the visible range of greater than 590 nanometers, (ii) a second organic photochromic substance having at least one absorption maximum in the visible range of between about 400 and less than 500 nanometers, and (iii) a third organic photochromic substance having an absorption maximum within the visible range of between about 400 about 500 nanometers and an absorption maximum within the visible range of between 500 and about 700 nanometers, and mixtures of said photochromic compounds.

19. The photochromic article of claim 18 wherein the organic photochromic compound is selected from the group consisting of spiro(indoline)naphthoxazines, spiro(indoline)pyridobenzoxazines, spiro(benzindoline)pyridobenzoxazines, spiro(benzindoline)naphthoxazines, spiro(benzindoline)naphthopyrans, spiro(indoline)benzoxazines, spiro(indoline)benzopyrans, spiro(indoline)naphthopyrans, spiro(indoline)quinopyrans, spiro(indoline)pyrans, chromenes, and mixtures of such photochromic compounds.

* * * * *